United States Patent
Buhr

(10) Patent No.: US 8,157,653 B2
(45) Date of Patent: Apr. 17, 2012

(54) AUTOMATIC PLAYER INFORMATION GENERATION FOR INTERACTIVE ENTERTAINMENT

(75) Inventor: Brian D. Buhr, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 569 days.

(21) Appl. No.: 12/350,846

(22) Filed: Jan. 8, 2009

(65) Prior Publication Data

US 2010/0173712 A1    Jul. 8, 2010

(51) Int. Cl.
*A63F 13/00* (2006.01)
(52) U.S. Cl. .......................................................... 463/42
(58) Field of Classification Search ................. 463/7–15, 463/42
See application file for complete search history.

(56) References Cited

U.S. PATENT DOCUMENTS

| | | | |
|---|---|---|---|
| 6,769,987 B1 * | 8/2004 | Morita et al. | 463/31 |
| 7,828,661 B1 * | 11/2010 | Fish et al. | 463/42 |
| 7,909,332 B2 * | 3/2011 | Root | 273/461 |
| 2004/0049469 A1 * | 3/2004 | Saruhashi et al. | 705/79 |
| 2004/0087372 A1 * | 5/2004 | Yamana et al. | 463/42 |
| 2004/0143852 A1 * | 7/2004 | Meyers | 725/133 |
| 2004/0192440 A1 * | 9/2004 | Evans et al. | 463/30 |
| 2004/0230683 A1 * | 11/2004 | Adamczyk et al. | 709/227 |
| 2004/0249837 A1 * | 12/2004 | Yagi et al. | 707/100 |
| 2005/0192864 A1 * | 9/2005 | Ganz | 705/14 |
| 2006/0068916 A1 * | 3/2006 | Hiranoya et al. | 463/42 |
| 2006/0121990 A1 * | 6/2006 | O'Kelley et al. | 463/42 |
| 2006/0142085 A1 * | 6/2006 | Kim | 463/42 |
| 2006/0258463 A1 * | 11/2006 | Cugno et al. | 463/42 |
| 2006/0287096 A1 * | 12/2006 | O'Kelley et al. | 463/42 |
| 2007/0218997 A1 * | 9/2007 | Cho | 463/42 |
| 2008/0113815 A1 * | 5/2008 | Weingardt | 463/42 |
| 2008/0274815 A1 * | 11/2008 | Root | 463/48 |
| 2009/0005161 A1 * | 1/2009 | Aouizerate | 463/25 |
| 2009/0209351 A1 * | 8/2009 | Umaki et al. | 463/42 |
| 2009/0222517 A1 * | 9/2009 | Kalofonos et al. | 709/204 |
| 2009/0275399 A1 * | 11/2009 | Kelly et al. | 463/27 |
| 2010/0023506 A1 * | 1/2010 | Sahni et al. | 707/5 |

* cited by examiner

*Primary Examiner* — Fernando L Toledo
*Assistant Examiner* — Ankush Singal
(74) *Attorney, Agent, or Firm* — Joshua D. Isenberg; JDI Patent

(57) ABSTRACT

Automatic player profile generation may be implemented for an interactive online game in which one or more players interact via one or more client devices connected to a server device via a network. Information relating to game activity may be collected for the one or more players during one or more game sessions with the server device. One or more player statistics relevant to the game activity may be calculated for each of the one or more players during the game session based on the information relating to game activity with the server device. A player profile may be generated for each of the one or more players with the server. Each player profile may include the one or more player statistics for a corresponding one of the one or more players.

25 Claims, 6 Drawing Sheets

AUTOMATIC PLAYER INFORMATION GENERATION FOR INTERACTIVE ENTERTAINMENT

FIELD OF THE INVENTION

Embodiments of the invention are related to interactive entertainment and more particularly to online video games.

BACKGROUND OF THE INVENTION

Online game technology provides a mechanism by which players located at remote sites can play interactive games with each other over a computer network, such as the Internet. The interactive games may range from simple text based games involving only a single player or a few players to games incorporating complex graphics and virtual worlds populated by many players simultaneously. Many online games have associated online communities, making such online games a form of social activity allowing players from all over the globe to participate in games and otherwise interact with each other. Because of the relatively large number of potential players and the fact that players often do not know each other beforehand, one of the challenges to online games is to match players wishing to play a game. Services have been created that allow players to be automatically matched against other players wishing to play a given game. Other online games have so-called online "lobbies" that allow people interested in playing games to meet.

Many online games allow a group of players to form a team and compete against other teams. The players on a team often need to know other players' information when they choose teammates and face their opponents. In order to make games more exciting and interesting, online games often provide some simple information, such as leaderboards, players' biographies (referred to herein as a bio). The leaderboards is a ranking list, which displays each player's score, overall ranking etc. A leaderboard provides an overall picture about the players who have played a given game. However, the information provided by a leaderbord tends to be very limited in terms of its usefulness for helping players to choose teammates, or evaluate opponents. Specifically, a leaderboard generally only advises how good a player is, but can't provide detailed information about why the player is good, and in which category or categories the player is particularly good at. For example, a leaderboard generally will not provide information regarding which player is the most balanced player. Similarly, a leaderboard does not provide specifically detailed information regarding a player's performance. For, example, in a first person shooter (FPS) game, a leaderboard might indicate an overall player ranking, but might not indicate whether that player has 71 sniper rifle kills.

Some online games allow players to submit their own biographies. However, these are usually ignored because they are perceived as being inaccurate representations of a player's real skill.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
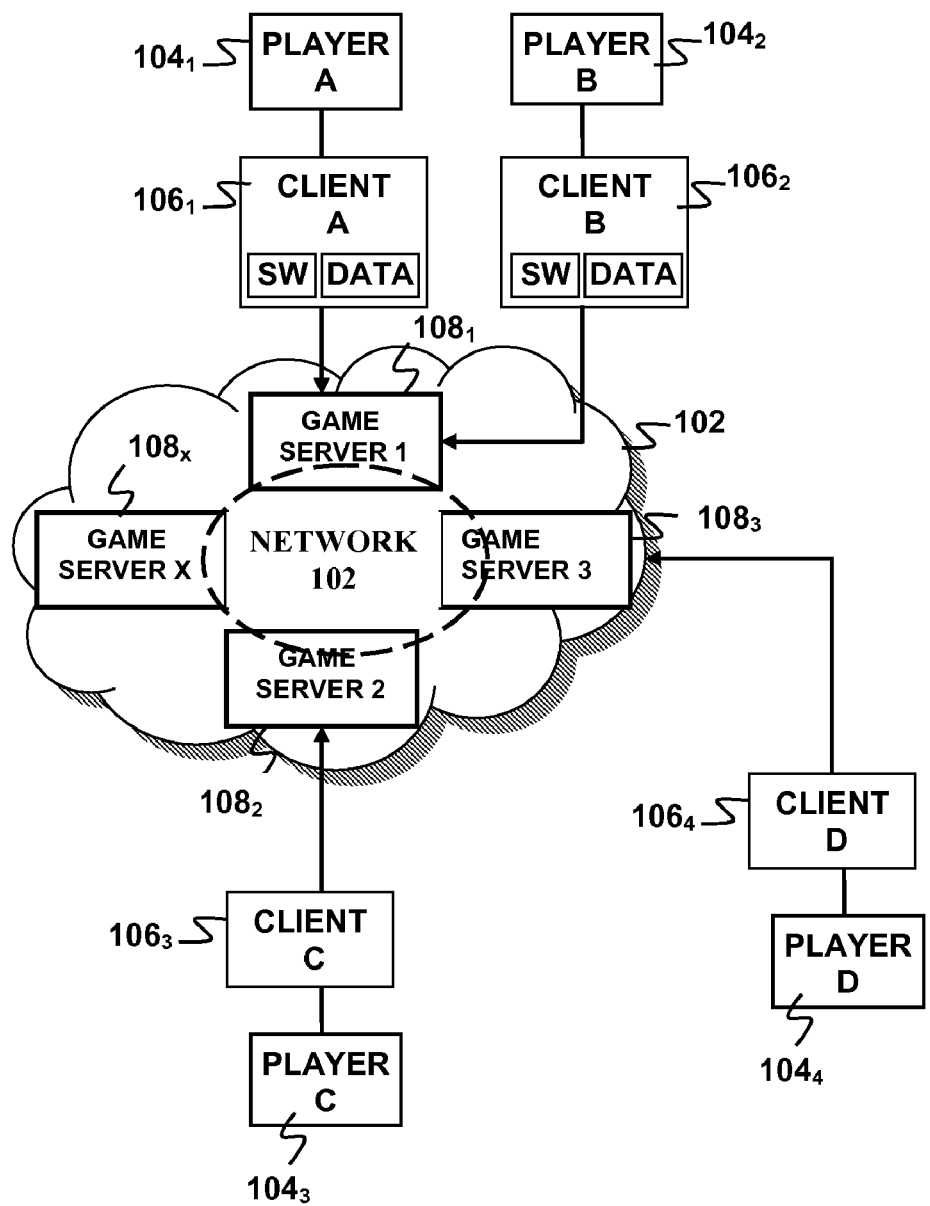
FIG. 1 is a schematic drawing of a computer network infrastructure illustrating examples of automatic player information generation according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention overcome the above-described disadvantages with the prior art by introducing an automatic player profile generation system. Such a system may implement the following functions: a) collecting information relating to game activity for the one or more players during one or more game sessions with the server device; b) calculating one or more player statistics relevant to the game activity for each of the one or more players during the game session based on the information relating to game activity with the server device; and c) generating a player profile for each of the one or more players with the server, wherein each player profile includes the one or more player statistics for a corresponding one of the one or more players. The system may store all information corresponding to the player profile in a computer readable storage medium. In some implementations, the game play information may be collected from one or more of the client devices.

The player profile includes player biographical information based on the one or more player statistics for each of the one of the one or more players, as well as relevant player statistics and a style identifier associated with a particular style of play derived from the statistics. The biographical information may include a favorite game mode, a play style or one or more career highlights, e.g., as depicted in the snapshots shown in FIGS. 5A-5B.

The above functions offer the possibility to provide some innovative features. For example, this system may associate a particular style of game play with each player profile based on the one or more player statistics for each of the one of one or more players. A style identifier related to the particular style of game play may be included in the player profile. A server can access the player profile for a given one of the one or more players and present that player profile to a client device of a different one of the one or more players in response to a request from that client device for information relating to the given one of the one or more players.

According to some embodiments, one or more players can design a game level. In such an embodiment, collecting player information may include monitoring the generation of one or more levels by one or more players and calculating player statistics may include calculating a popularity of a game level designed by a particular one of the one or more players.

In some embodiments, the system may receive a request from a client device for a new player to join a subsequent game session. The server may automatically match the new player with a team of one or more other players based on a player profile associated with the new player and player profiles associated with the one or more other players. The new players profile may include a style identifier related to a particular style of game play determined from one or more statistics in the new player's profile. Each of the one or more other players' profiles may also include style identifiers related to particular style of game play determined from one or more statistics in the one or more other players profiles. The system may match the new player with the team of one or more other players, e.g., by balancing the new player's particular style of play and the styles of play associated with the one or more other players.

The player profile can be generated in a batch interval by a server running the game or on-demand by a given player's game console to alleviate database load. The player profile may be regularly updated to provide the latest information by scanning multiple statistical sources. Generally, the nature of the game being played provides guidance as to which statistics are relevant to which categories. The player profile may include statistics relating to one or more different categories.

By way of example, and not by way of limitation, a player profile may be generated in a FPS game that involves multiple player modes (e.g., death match, capture the flag, etc.), different vehicles, and different weapons. The system may monitor a player's behavior in a game by recording, which mode the player chooses, which vehicles and weapons the player uses, for how long they are used and how effectively. The stats report may indicate player statistics such as time played in each game mode (e.g., death match, capture the flag), time played in each vehicle type, time using each weapon type, total number of kills with each weapon and vehicle type etc.

It is noted that a "player profile" may include player biographical information, as well as relevant player statistics and a style identifier associated with a particular style of play derived from the statistics. Biographical information can also be derived from the player statistics. For example, in a game where a player has the option of riding or driving different types of vehicles, the profile generator running on the server can monitor the amount of time a player spends in different types of vehicles. The amount of time spent in each vehicle may be regarded as an example of a player statistic. The profile generator may determine from a ranking of such statistics, the vehicle that the player spends the most time in. This vehicle may be identified in the player biographical information as the player's "favorite vehicle". The profile generator may also determine whether the player spends more time in that vehicle as a driver or a rider.

By using the method and system as described herein, players can find a teammate who is strong in particular categories. Players (or the system) can use this information for the purpose of automatically or manually matchmaking or balancing teams. For example, a given team may have a first player who is a very good gunner/killer, and the team needs a good defender to cover the first player's back. Players also can use the information in the stats report to evaluate potential teammates to find a player who does well as a defender. Furthermore, players may generate a stats report for their potential opponents to evaluate those opponents, find out their strengths and/or weaknesses, and setup a strategy for competing with them. Furthermore, a stats report may provide information that can be used to benchmark the better players. For example, a stats report can show common statistical characteristics of players who succeed in a particular game mode, so other players can determine what skill sets are needed for success in that game mode.

Figure 2:
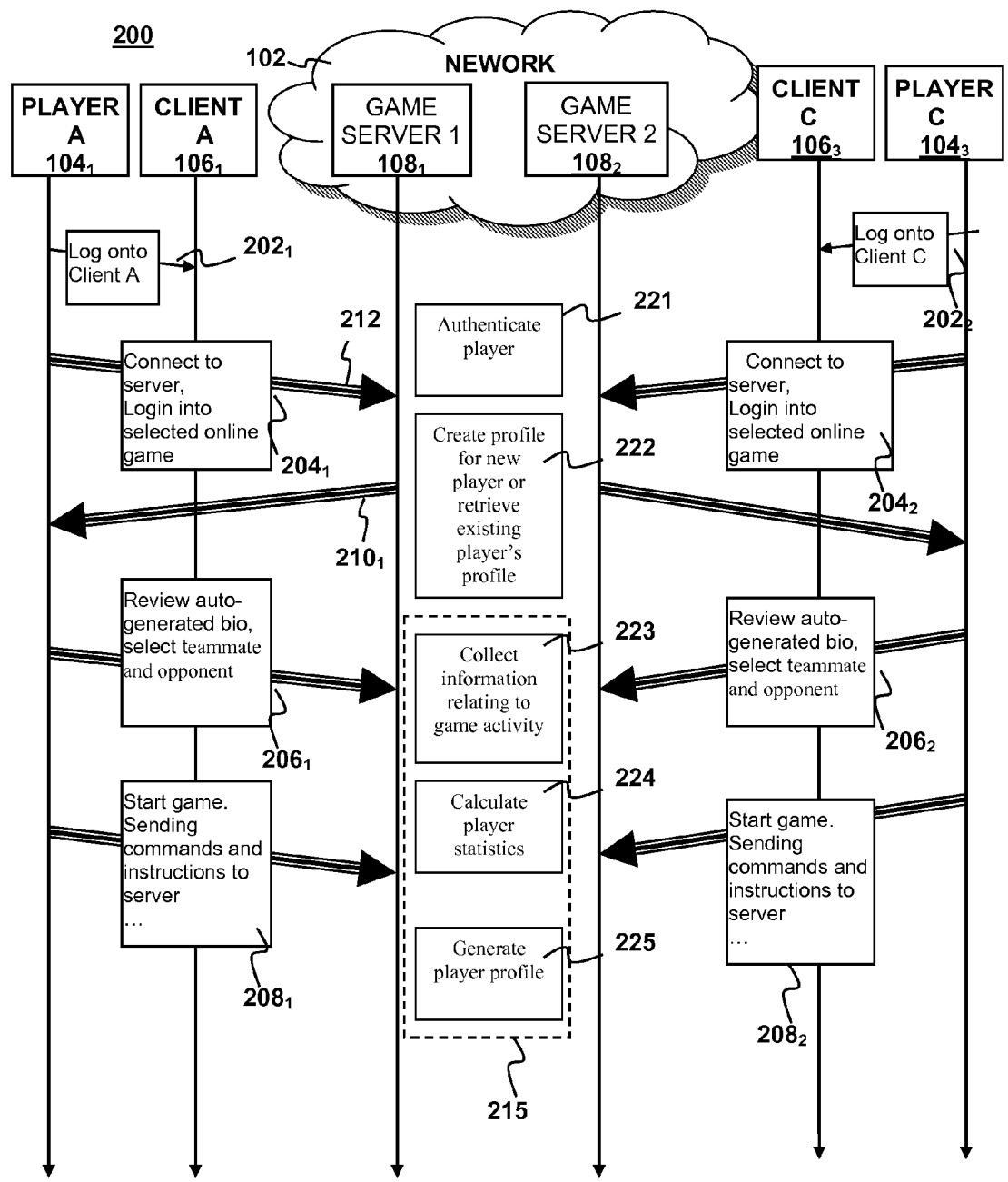
FIG. 2 is a flow diagram illustrating examples of methods of automatic player information generation according embodiments of the present invention.

Examples of embodiments of the present invention may operate as described with respect to FIG. 1 and FIG. 2. As seen in FIG. 1, an online gaming system 100 according to an embodiment of the present invention may include one or more game servers $108_1$, $108_2$, $108_3$ . . . $108_x$. The game servers may be located at different places in the world and connected to each other through a network 102, e.g., a wide-area network, such as the Internet. Alternatively, the servers may be co-located in a common facility, such as a server farm. The game servers may be configured, e.g., through suitable programming, to communicate with each other, share and synchronize data, perform calculations associated with player of an online game in a way that is transparent to players 104 playing the game. The players 104 may interact with one or more of the game servers $108_1$, $108_2$, $108_3$ . . . $108_x$ via client devices 106. Generally, each client device 106 receives inputs from a corresponding player 104 indicating that players actions and decisions within the context of the game. The servers utilize the inputs from the client devices 106 and apply a set of game rules to those inputs. The game rules may relate to simulation of game environment in terms of its geography, physics, and general thematic context. The game rules may arbitrate a player's interaction the game environment and/or with other players or non-player characters in that environment. Each client device 106 may use pre-downloaded/installed online game client software to connect to one of the online game servers. By way of example, each client device 106 may be a game console, such as a PlayStation2 or PlayStation3 from Sony Computer Entertainment, Inc of Tokyo, Japan. Alternatively, the client devices may be portable game consoles, personal computers or other devices capable of connecting to a computer network and implementing gaming software.

By way of example, and not by way of limitation, a, player $104_1$ may login into client device $106_1$, and initiate game client software executable by a computer processor on the client device. The client software can provide an encrypted tunnel to one online game server $108_1$, after ID/password authentication, player $104_1$ joins into this game and become an active player. Using the same sequence, other players $104_2$, $104_3$ and $104_4$ can connect to online game server $108_2$, $108_3$ . . . $108_x$ through client PC/console $106_2$, $106_3$ and $106_4$ respectively, and become active players. This information may be exchanged and synchronized among servers 108 in the server farm, now each player 104 can see others in player pool, and can start forming teams and playing the game. Additional game servers may be added to the system 100 if needed.

The system shown in FIG. 1 may operate as shown in FIG. 2. By way of example, and not by way of limitation, the player $104_1$ logging into client device $106_1$ may wish to connect to one of the online game server and find other players to play the game. In this example, it is assumed for the sake of simplification that the client device already has the online game client software installed, and is connected to a server. In general, the player doesn't need to know which game server the client device is connected to or the where game server and other players located at. In some embodiments, a players' profile may be created and saved in a database under the player's user name the first time the player registers into the game. The database may be stored in whole or in part on the player's client device or on one or more of the servers.

By way of example, to join into a game, the player $104_1$ may log into the client device $106_1$ as indicated at $202_1$, and after authenticating player as indicated at 221, connect to game server $108_1$ through an encrypted tunnel 212 as indicated at $204_1$. Afterward, all communication between player and server go through tunnel 212. After joining into a game, the player may become active in a player pool, and information relating to the player may be exchanged among server farm 108. If information relating to the player $104_1$ is already stored in the database, the game server $108_1$ may retrieve player's information, e.g., profile and stats, from database, as indicated at 222. At the same time, other players $104_2$, $104_3$ and $104_4$ may similarly connect to game servers $108_2$, $108_3$ and $108_x$ via client devices $106_2$, $106_3$ and $106_4$ respectively through tunnel 212. The servers may mark these players as active players and retrieve their profiles and auto-generate stats reports from the database, which can be accessed by all active players. By reviewing other players' profile and stats reports, each player can select and form a team and create their strategy about how to fight with their opponents 206. Then players start to play game, a lot of commands and instructions are sent to server over tunnel 212, which is indicated at 208.

Once the game is started, the server may begin to run a "player profile generation" software in the background as indicated at 215. In particular, information n relating to game activity for the one or more players may be collected during one or more game sessions with the server device, as indicated at 223. One or more player statistics relevant to the game activity may be calculated with the server device for each of the one or more players during the game session based on the information relating to game activity, as indicated at 224. A player profile may be generated for each of the one or more players with the server. Each player profile may include player statistics for a corresponding one of the players, as indicated at 225.

The generated player profiles may be saved in a database, which may be stored, e.g., in a storage device associated with one or more of the servers.

Figure 3:
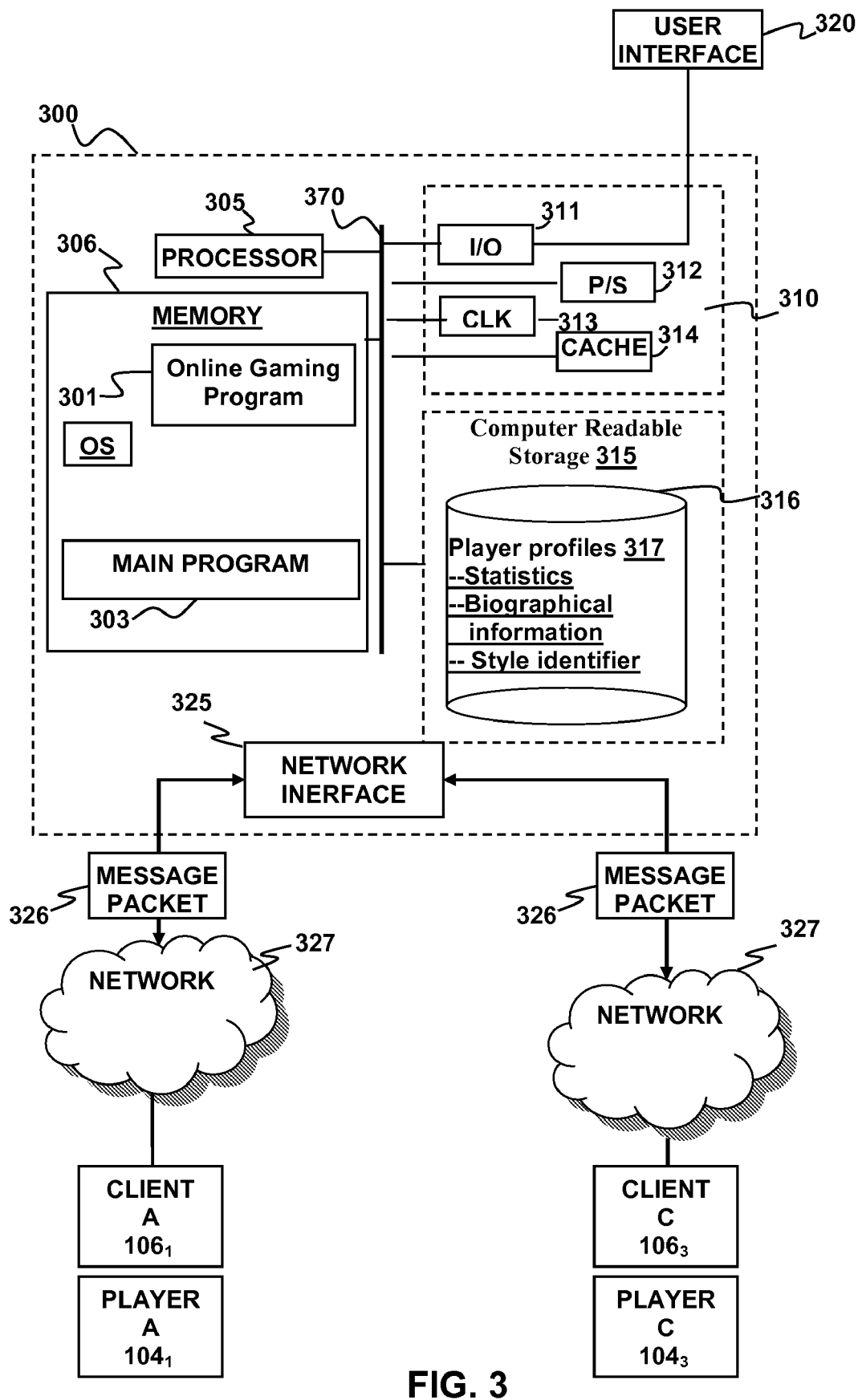
FIG. 3 is a schematic drawing of a server configured to implement automatic player information generation according to an embodiment of the present invention.

By way of example, the servers $108_1$, $108_2$, $108_3$ and $108_x$ may be configured as shown in FIG. 3, which depicts a block diagram illustrating the components of a game server 300 according to an embodiment of the present invention. By way of example, and without loss of generality, the server device 300 may be implemented as a computer system, such as a high-end server computer, suitable for practicing an embodiment of the invention. The server device 300 may include a processor 305 configured to run software applications and optionally an operating system OS. The processor 305 may include one or more processing cores. By way of example and without limitation, the processor 305 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A memory 306 is coupled to the processor 305. The memory 306 may store computer-executable applications configured for execution on the processor 305. The instructions may be configured so that, upon execution, they cause the server 300 to implement a method for automatic player profile generation for an interactive online game in which one or more players interact via one or more client devices connected to the server device via a network. The method may comprise: a) collecting information relating to game activity for the one or more players during one or more game sessions with the server device; b) calculating one or more player statistics relevant to the game activity for each of the one or more players during the game session based on the information relating to game activity with the server device; and c) generating a player profile for each of the one or more players with the server. Each player profile may include the one or more player statistics for a corresponding one of the one or more players.

The memory 306 may be in the form of an integrated circuit, e.g., RAM, DRAM, ROM, and the like). The server 300 may also include well-known support functions 310, such as input/output (I/O) elements 311, power supplies (P/S) 312, a clock (CLK) 313 and cache 314. The server device 300 may further include a storage device 315 that provides non-volatile storage for applications and data. Both the memory 306 and the storage device 315 are examples of computer-readable storage media. By way of example, the storage device 315 may be a fixed disk drive, removable disk drive, flash memory device, tape drive, CD-ROM, DVD-ROM, Blu-ray, HD-DVD, UMD, or other optical storage devices. A database 316 may be built and maintained in this storage device 315. The database 316 may comprise information corresponding to the player profiles 317 and other information. Player profiles 317 may include player statistics, biographical information and a style identifier. The storage device 315 may also have stored computer program instructions embodied therein, wherein the computer program instructions are configured, when executed, to cause a server to implement a method for automatic player profile generation for an interactive online game in which one or more players interact via one or more client devices connected to a server device via a network. The method may comprise: a) collecting information relating to game activity for the one or more players during one or more game sessions with the server device; b) calculating one or more player statistics relevant to the game activity for each of the one or more players during the game session based on the information relating to game activity with the server device; and c) generating a player profile for each of the one or more players with the server. Each player profile may include the one or more player statistics for a corresponding one of the one or more players.

As noted above, the player profiles 317 may be stored in a computer readable storage medium, such as the memory 306 or storage device 315. Each player profile may associate a particular style of game play with a corresponding player based on the player statistics corresponding player. By way of example, and not by way of limitation, each player profile 317 may include a style identifier related to the particular style of game play. The player profile for a given one of the one or more players may be accessed with the server 300 and presented to a client device of one or more different players in response to a request from the client device for information relating to the given one of the one or more players. Selected player biographical information may be associated with each player profile 317 based on the one or more player statistics for each of the one of the one or more players.

A user interface 320 may be used to communicate user inputs from one or more users to the server 300. By way of example, one or more of the user interface 320 may be coupled to the server device 300 via the I/O elements 311. Examples of suitable input devices that may be used as the interface 320 include keyboards, mice, joysticks, touch pads, touch screens, light pens, still or video cameras, and/or microphones or some combination of two or more of these. The server 300 may include a network interface 325 to facilitate communication via an electronic communications network 327. The network interface 325 may be configured to implement wired or wireless communication over local area networks and wide area networks such as the Internet. The server 300 may send and receive messages to/from the clients or exchange and synchronize with other servers via one or more message packets 326 over internet cloud 327 to client PC/console 106 or other game servers 108.

The components of the server 300, including the CPU 305, memory 306, support functions 310, data storage 315, user input devices 320, network interface 325, and audio processor 355 may be operably connected to each other via one or more data buses 370. These components may be implemented in hardware, software or firmware or some combination of two or more of these.

A server-side online gaming program 301 may be stored in a computer-readable storage medium, such as the memory 306 or storage device 315, in the form of instructions that can be executed on the processor 305. The instructions of the online gaming program 301 can implement the steps of the player profile generation software 215 as show and described with respect to FIG. 2. By way of example, during the game session, the program 301 may include instructions to collect game activity information for players 223, calculate player statistics based on the information relating to game activity 224, and generate player profile 225. The collected information can be saved into storage by different categories. The player's biographical information can be auto generated by scanning multiple statistical categories. There also can be a plug-in, which can let the player or developers define which statistics are inspected. When the biographical information is collected, this program 301 will obtain the highest values from each category and then randomly choose a subset items to help describe the player. Alternatively, certain categories may always be inspected and then be used to assign a play style to the player or to generate sentences in the form of a short biography to make it appear like it was player-written. The biographical information can be stored in player profiles in database 316, which may be installed on storage device 315

This biographical information can be retrieved in a batch interval or on-demand by player in order to alleviate database load. It also can be retrieved by any user who wants to see a description about a player that is more like prose writing than numeric statistic lists, and which could be the result of interpretation of many statistical fields.

The program 301 may be configured to operate in conjunction with other programs, such as an operating system OS. Furthermore, the program 301 may additionally operate in conjunction with one or more instructions configured to implement an interactive environment on remote client devices. By way of example, such instructions may be part of a main program 303, such as a video game program. Alternatively, the main program 303 may be a program for interfacing with a virtual world. The main program 303 may be configured to facilitate display of a scene of a portion of the simulated environment from the camera POV on a video display and change the scene as the camera POV changes in response to movement of the camera POV along a camera path during the user's interaction with the simulated environment. The main program 303 may include instructions for physics simulation, camera management and the like.

In addition, the program 301 may be configured with instructions to handle security at the server 300. For example, the program 301 may determine whether to encrypt the instruction and data send and receive between client and server or servers in term of the contents' sensitivity. Specifically, it may be desirable for security reasons to encrypt transferred data that is to be transferred over publicly accessible network, such as the Internet. The Memory 306 may include an encryption program ENC, which may be called by the file transfer program 301 and executed on the processor 305 to encrypt one or more files 316.

Figure 4:
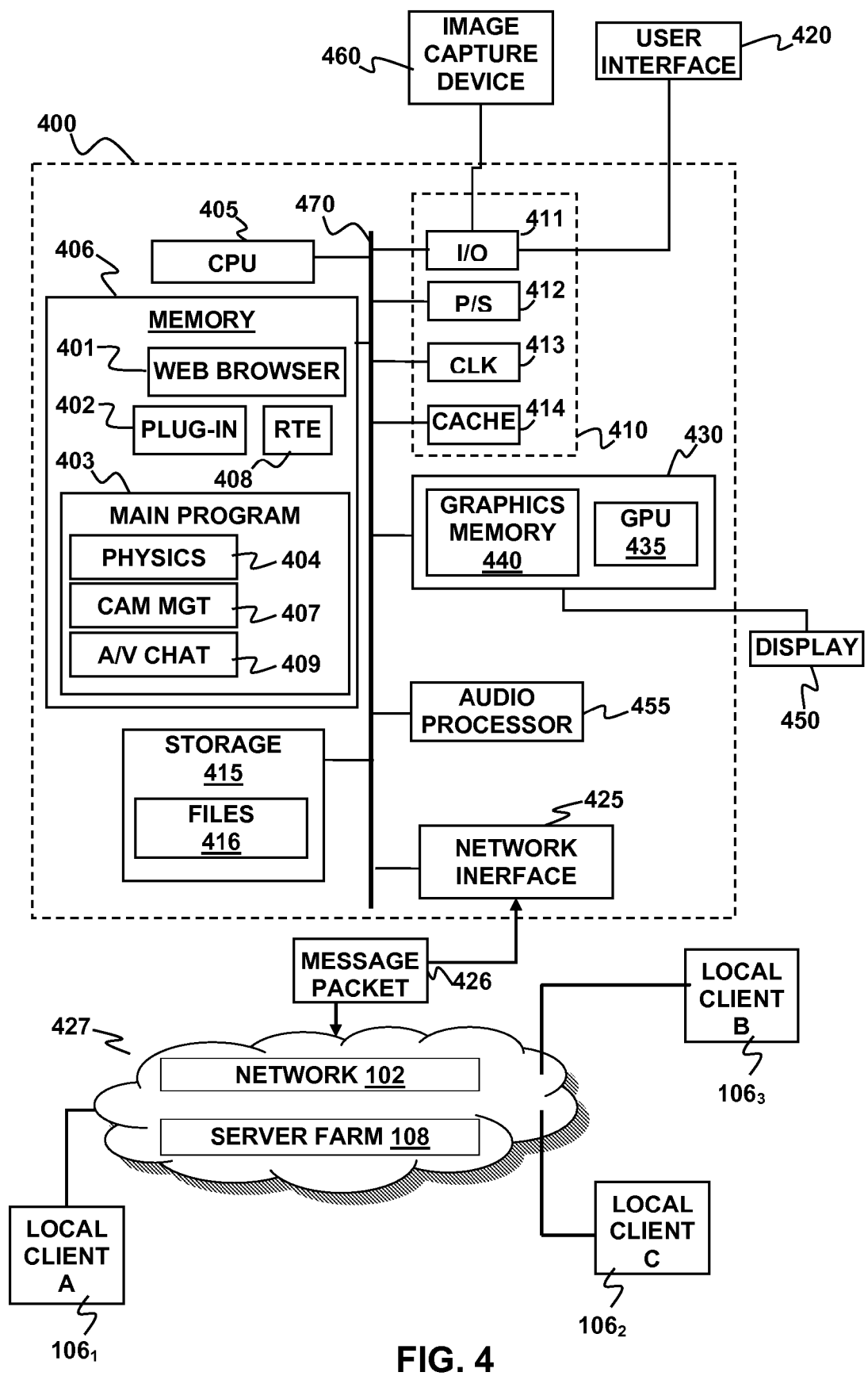
FIG. 4 is a schematic drawing of a client device configured to implement automatic player information generation according to an embodiment of the present invention.

Embodiments of the present invention may be used for automatic player profile generation involving any number of different types of client devices. By way of example, the client devices $106_1$, $106_2$, $106_3$ may be configured as shown in FIG. 4, which depicts a block diagram illustrating the components of a client device 400 according to an embodiment of the present invention. By way of example, and without loss of generality, the client device 400 may be implemented as a computer system, such as a personal computer, video game console, personal digital assistant, or other digital device, suitable for practicing an embodiment of the invention. The client device 400 may include a central processing unit 405 configured to run software applications and optionally an operating system. The processing unit 405 may include one or more processing cores. By way of example and without limitation, the processing unit 405 may be a parallel processor module, such as a Cell Processor, e.g., as described above. A memory 406 is coupled to the processing unit 405. The memory 406 may store applications and data for use by the CPU 405. The memory 406 may be in the form of an integrated circuit, e.g., RAM, DRAM, ROM, and the like).

The client device 400 may also include well-known support functions 410, such as input/output (I/O) elements 411, power supplies (P/S) 412, a clock (CLK) 413 and cache 414. The client device 400 may further include a storage device 415 that provides non-volatile storage for applications and data. The storage device 415 may be used for temporary or long-term storage of files 416. By way of example, the storage device 415 may be a fixed disk drive, removable disk drive, flash memory device, tape drive, CD-ROM, DVD-ROM, Blu-ray, HD-DVD, UMD, or other optical storage devices.

The components of the client device 400, including the CPU 405, memory 406, support functions 410, data storage 415, user input devices 420, network interface 425, and audio processor 455 may be operably connected to each other via one or more data buses 470. These components may be implemented in hardware, software or firmware or some combination of two or more of these.

One or more user input devices 420 may be used to communicate user inputs from one or more users to the computer client device 400. By way of example, one or more of the user input devices 420 and image capture device 460 may be coupled to the client device 400 via the I/O elements 411. Examples of suitable input device 420 include keyboards, mice, joysticks, touch pads, touch screens, light pens, still or video cameras, digital cameras, and/or microphones. The client device 400 may include a network interface 425 to facilitate communication via an electronic communications network 427 including Internet 102. The network interface 425 may be configured to implement wired or wireless communication over local area networks and wide area networks such as the Internet. The client device 400 may send and receive data and/or commands and instruction via one or more message packets 426 over the Internet 102 to game servers 108.

A web browser or online game client application program 401 may be stored in the memory 406 in the form of instructions that can be executed on the processor 405. Examples of commercially available web browsers include Netscape and Microsoft Internet Explorer. A plug-in 402 for a scripting language used by the web browser 401 and a runtime engine 408 for the scripting language may also be stored in memory and executed by the processing unit 405. The web browser or game client application program 401 may be used to facilitate, amongst other things, certain parts of a method for automatic player information generation, e.g., as described above with respect to FIG. 1 and FIG. 2.

In particular, the web browser or game client application 401 may be used to communicate with game server when player login into client device 400 and want to player online game. Once player open this program 401, it connects to a game server 108, after providing user and password for authentication, it creates an tunnel between client and server for this player, and transfer command and instructions 426 between them.

The web browser or game client application program 401 may operate in conjunction with one or more instructions configured to implement an interactive environment. By way of example, such instructions may be part of a main program 403, such as a video game program. Alternatively, the main program 403 may be a program for interfacing with a virtual world. The main program 403 may be configured to display a scene of a portion of the simulated environment from the camera POV on a video display and change the scene as the camera POV changes in response to movement of the camera POV along a camera path during the user's interaction with the simulated environment. The main program may include instructions for physics simulation 404, camera management 407 and audio-video chat 409. The main program 403 may call the impression enhancement program 401, physics simulation instructions 404, camera management instructions 407 and A/V chat 409, e.g., as a functions or subroutines.

The client device 400 may further comprise a graphics subsystem 430, which may include a graphics processing unit (GPU) 435 and graphics memory 440. The graphics memory 440 may include a display memory (e.g., a frame buffer) used for storing pixel data for each pixel of an output image. The graphics memory 440 may be integrated in the same device as the GPU 435, connected as a separate device with GPU 435, and/or implemented within the memory 406. Pixel data may be provided to the graphics memory 440 directly from the CPU 405. Alternatively, the processing unit 405 may provide the GPU 435 with data and/or instructions defining the desired output images, from which the GPU 435 may generate the pixel data of one or more output images. The data and/or instructions defining the desired output images may be stored in memory 406 and/or graphics memory 440. In an embodiment, the GPU 435 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 435 may further include one or more programmable execution units capable of executing shader programs.

The graphics subsystem 430 may periodically output pixel data for an image from the graphics memory 440 to be displayed on a video display device 450. The video display device 450 may be any device capable of displaying visual information in response to a signal from the client device 400, including CRT, LCD, plasma, and OLED displays. The computer client device 400 may provide the display device 450 with an analog or digital signal. By way of example, the display 450 may include a cathode ray tube (CRT) or flat panel screen that displays text, numerals, graphical symbols or images. In addition, the display 450 may include one or more audio speakers that produce audible or otherwise detectable sounds. To facilitate generation of such sounds, the client device 400 may further include an audio processor 455 adapted to generate analog or digital audio output from instructions and/or data provided by the processor 405, memory 406, and/or storage 415. Although, for the purpose of example, client PC/console and game servers are shown as being separate devices, embodiments of the present invention include the possibility that a client and server may be incorporated into the same device, e.g., in hardware, software, firmware or some combination of two or more of these.

Player information generated in accordance with embodiments of the present invention may be presented in many different formats. By way of example, and not by way of limitation, FIGS. 5A-5B depict sample screenshots illustrating two possible formats.

Figure 5A:
FIG. 5A is a screen shot depicting one possible configuration for presenting player information in accordance with an embodiment of the present invention.

The screenshot in FIG. 5A displays an auto-generated player biography. Left column lists this player's buddies. Right column shows the highlighted buddy MuthaMutha's biography, in which it states that MuthaMutha is added into buddy list at Dec. 15, 2007. MuthaMutha's favorite game mode is CAPTURE THE FLAG, his play style is defense, which means he is good at defense. It also illustrates some career highlights, such as Best weapon is mines because he already has 546 kills. He received Ribbon "CTF Defensive Merit" 9 times total, and awarded for 5 flag carrier kills in a round. These can explain why he is good at defense.

Figure 5B:
FIG. 5B is a screen shot depicting another possible configuration for presenting player information accordance with an embodiment of the present invention.

Another screenshot FIG. 5B, example format of player's scouting report. The left column displays opponent list, right column lists the highlighted user MuthaMutha's stats, it shows that MuthaMutha belongs to clan BAD, it also exhibits several statistical data, his favorite weapon is AK-47 silenced, his favorite vehicle is Jeep (as rider), his play style is defense (80% time in), his known strength is mine kills (528 kills), and his known weakness is teamkills (1024 kills).

Those of skill in the art may be able to devise other formats for presenting player profile information generated in accordance with embodiments of the present invention without departing from the scope of these teachings.

Embodiments of the present have significant advantages over other existing systems and methods for generation of player information for multi-player computer online games. In particular embodiments of the present invention allow for using of collected statistics to auto generate player's autobiography, real-time scouting report, real-time suggestions for how to succeed like others in a given game mode or category, to see your own or your opponents' strengths and/or weakness. By reviewing this auto generated stats report, players obtain positive feedback about their gameplay and what kind of role(s) they excel in or skills they possess. This makes online game play more popular because they stroke the player's ego and provide them that feeling of achievement and reward.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for automatic player profile generation for an interactive online game in which one or more players interact via one or more client devices connected to a server device via a network, the method comprising:
   a) automatically collecting information relating to game activity for the one or more players during one or more game sessions with the server device;
   b) automatically calculating one or more player statistics relevant to the game activity for each of the one or more players during the game session based on the information relating to game activity with the server device;
   c) automatically generating a player profile for each of the one or more players with the server, wherein each player profile includes the one or more player statistics for a corresponding one of the one or more players; and
   d) in response to a request from a client device for the given player to join a subsequent game session and, with the server, automatically matching the given player with a team of one or more other players based on a player profile associated with the given player and player profiles associated with the one or more other players, wherein matching the given player with the team of one or more other players includes balancing the given player and the one or more other players using one or more of the automatically generated statistics in the corresponding profiles for the given player and the one or more other players.

2. The method of claim 1, further comprising storing information corresponding to the player profile in a computer readable storage medium.

3. The method of claim 1, further comprising:
   associating a particular style of game play with each player profile based on the one or more player statistics for each of the one of the one or more players.

4. The method of claim 1, further comprising associating selected player biographical information with each player profile based on the one or more player statistics for each of the one of the one or more players.

5. The method of claim 1, wherein the online game is one wherein one or more of the one or more players can design a game level, and wherein a) includes monitoring the generation of one or more levels by one or more players.

6. The method of claim 1 wherein the given player's profile includes a style identifier related to a particular style of game play determined from one or more statistics in the given players profile and each of the one or more other players profiles includes style identifiers related to particular styles of game play determined from one or more statistics in the one or more other players' profiles.

7. The method of claim 1 wherein balancing the given player and the one or more other players includes balancing the particular style of play associated with the given player and the particular styles of play associated with the one or more other players.

8. The method of claim 1 wherein a) includes collecting game play information from one or more of the one or more client devices.

9. The method of claim 3, wherein the player profile includes a style identifier related to the particular style of game play.

10. The method of claim 3, further comprising:
    accessing the player profile for a given one of the one or more players with the server and presenting that player profile to a client device of a different one of the one or more players in response to a request from that client device for information relating to the given one of the one or more players.

11. The method of claim 4, wherein the player biographical information includes a favorite game mode, a play style or one or more career highlights.

12. The method of claim 5, wherein b) includes calculating a popularity of a game level designed by a particular one of the one or more players.

13. A system for automatic player profile generation for an interactive online game in which one or more players interact via one or more client devices connected to a server device via a network, comprising:
    a processor;
    a memory; and
    processor-executable instructions stored in the memory and configured for execution on the processor, wherein the instructions are configured, when executed, to cause the server to implement a method for automatic player profile generation for an interactive online game in which one or more players interact via one or more client devices connected to a server device via a network, the method comprising:
    a) collecting information relating to game activity for the one or more players during one or more game sessions with the server device;
    b) calculating one or more player statistics relevant to the game activity for each of the one or more players during the game session based on the information relating to game activity with the server device;
    c) generating a player profile for each of the one or more players with the server, wherein each player profile includes the one or more player statistics for a corresponding one of the one or more players; and
    d) in response to a request from a client device for the given player to join a subsequent game session and, with the server, automatically matching the given player with a team of one or more other players based on a player profile associated with the player and player profiles associated with the one or more other players, wherein matching the given player with the team of one or more other players includes balancing the given player and the one or more other players using one or more of the automatically generated statistics in the corresponding profiles for the given player and the one or more other players.

14. A non-transitory computer-readable storage medium having computer program instructions embodied therein, wherein the computer program instructions are configured, when executed, to cause a server to implement a method for automatic player profile generation for an interactive online game in which one or more players interact via one or more client devices connected to a server device via a network, the method comprising:
    a) automatically collecting information relating to game activity for the one or more players during one or more game sessions with the server device;
    b) automatically calculating one or more player statistics relevant to the game activity for each of the one or more players during the game session based on the information relating to game activity with the server device;
    c) automatically generating a player profile for each of the one or more players with the server, wherein each player profile includes the one or more player statistics for a corresponding one of the one or more players; and
    d) in response to a request from a client device for the given player to join a subsequent game session and, with the server, automatically matching the given player with a team of one or more other players based on a player profile associated with the player and player profiles associated with the one or more other players, wherein matching the given player with the team of one or more other players includes balancing the given player and the one or more other players using one or more of the automatically generated statistics in the corresponding profiles for the given player and the one or more other players.

15. The computer-readable storage medium of claim 14, wherein the method further comprises storing information corresponding to the player profile in a computer readable storage medium.

16. The computer-readable storage medium of claim 14, wherein the method further comprises:
   associating a particular style of game play with each player profile based on the one or more player statistics for each of the one of the one or more players.

17. The computer-readable storage medium of claim 14, wherein the method further comprises associating selected player biographical information with each player profile based on the one or more player statistics for each of the one of the one or more players.

18. The computer-readable storage medium of claim 16, wherein the player profile includes a style identifier related to the particular style of game play.

19. The computer-readable storage medium of claim 16, wherein the method further comprises:
   accessing the player profile for a given one of the one or more players with the server and presenting that player profile to a client device of a different one of the one or more players in response to a request from that client device for information relating to the given one of the one or more players.

20. A system for automatic player profile generation for an interactive online game in which one or more players interact via one or more client devices connected to a server device via a network, the method comprising:
   a) means for automatically collecting information relating to game activity for the one or more players during one or more game sessions with the server device;
   b) means for automatically calculating one or more player statistics relevant to the game activity for each of the one or more players during the game session based on the information relating to game activity with the server device;
   c) means for automatically generating a player profile for each of the one or more players with the server, wherein each player profile includes the one or more player statistics for a corresponding one of the one or more players; and
   d) in response to a request from a client device for the given player to join a subsequent game session and, with the server, automatically matching the given player with a team of one or more other players based on a player profile associated with the player and player profiles associated with the one or more other players, wherein matching the given player with the team of one or more other players includes balancing the given player and the one or more other players using one or more of the automatically generated statistics in the corresponding profiles for the given player and the one or more other players.

21. The system of claim 20, further comprising means for storing information corresponding to the player profile in a computer readable storage medium.

22. The system of claim 20, further comprising means for associating a particular style of game play with each player profile based on the one or more player statistics for each of the one of the one or more players.

23. The system of claim 20, further comprising means for associating selected player biographical information with each player profile based on the one or more player statistics for each of the one of the one or more players.

24. The system of claim 22, wherein the player profile includes a style identifier related to the particular style of game play.

25. The system of claim 22, further comprising means for accessing the player profile for a given one of the one or more players with the server and presenting that player profile to a client device of a different one of the one or more players in response to a request from that client device for information relating to the given one of the one or more players.

* * * * *